(12) United States Patent
Bae et al.

(10) Patent No.: US 11,152,008 B2
(45) Date of Patent: Oct. 19, 2021

(54) ELECTRONIC APPARATUS, METHOD FOR CONTROLLING THEREOF AND COMPUTER READABLE RECORDING MEDIUM

(71) Applicant: SAMSUNG ELECTRONICS CO., LTD., Suwon-si (KR)

(72) Inventors: Jaehyun Bae, Suwon-si (KR); Yongjun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 16/225,282

(22) Filed: Dec. 19, 2018

(65) Prior Publication Data

US 2019/0189133 A1    Jun. 20, 2019

(30) Foreign Application Priority Data

Dec. 19, 2017  (KR) .................. 10-2017-0175060

(51) Int. Cl.
| | | |
|---|---|---|
| *G10L 17/24* | (2013.01) | |
| *G10L 17/06* | (2013.01) | |
| *G10L 17/02* | (2013.01) | |
| *G06F 21/36* | (2013.01) | |
| *G06F 21/31* | (2013.01) | |
| *G06F 21/32* | (2013.01) | |
| *G10L 15/00* | (2013.01) | |

(52) U.S. Cl.
CPC .............. *G10L 17/24* (2013.01); *G06F 21/31* (2013.01); *G06F 21/32* (2013.01); *G06F 21/36* (2013.01); *G10L 17/02* (2013.01); *G10L 17/06* (2013.01); *G10L 15/00* (2013.01)

(58) Field of Classification Search
CPC ......... G10L 17/24; G10L 17/02; G10L 17/06; G10L 15/00; G06F 21/31; G06F 21/32; G06F 21/36
USPC ........................................................ 740/246
See application file for complete search history.

(56) References Cited

U.S. PATENT DOCUMENTS

| | | |
|---|---|---|
| 2006/0293898 A1 | 12/2006 | Ollason |
| 2008/0172230 A1 | 7/2008 | Hayakawa |
| 2009/0171660 A1 | 7/2009 | Jian et al. |
| 2013/0055366 A1 | 2/2013 | Chao et al. |
| 2016/0021090 A1* | 1/2016 | Qian ................. G06F 21/46 726/6 |
| 2016/0035074 A1* | 2/2016 | Jeong ................. G06T 3/40 382/282 |

FOREIGN PATENT DOCUMENTS

| | | |
|---|---|---|
| JP | 4263439 | 5/2009 |
| JP | 4672003 | 4/2011 |

(Continued)

OTHER PUBLICATIONS

International Search Report and Written Opinion dated Apr. 5, 2019, issued in International Application No. PCT/KR2018/016187.

*Primary Examiner* — Quynh H Nguyen

(74) *Attorney, Agent, or Firm* — Nixon & Vanderhye P.C.

(57) ABSTRACT

An electronic apparatus includes a memory configured to store a preset password, and a processor configured to provide information with respect to a password modification method and to perform an authentication process for an input password using the preset password and the password modification method.

18 Claims, 11 Drawing Sheets

(56) References Cited

FOREIGN PATENT DOCUMENTS

| JP | 2015-007941 | 1/2015 | | |
| JP | 2016-118891 | 6/2016 | | |
| JP | 2016118891 A | * 6/2016 | ............... | A63F 5/04 |
| JP | 2017-142651 | 8/2017 | | |
| KR | 10-2008-0019210 | 3/2008 | | |
| KR | 10-1424962 | 8/2014 | | |
| KR | 10-1432943 | 8/2014 | | |

* cited by examiner

ELECTRONIC APPARATUS, METHOD FOR CONTROLLING THEREOF AND COMPUTER READABLE RECORDING MEDIUM

CROSS-REFERENCE TO RELATED APPLICATION

This application is based on and claims priority under 35 U.S.C. § 119 to Korean Patent Application No. 10-2017-0175060, filed Dec. 19, 2017 in the Korean Intellectual Property Office, the disclosure of which is incorporated by reference herein in its entirety.

BACKGROUND

1. Field

The present disclosure relates generally to an electronic apparatus, a method for controlling thereof, and a computer readable recording medium, and, for example, to an electronic apparatus for preventing and/or reducing password exposure by performing authentication with a modified password, a method for controlling thereof, and a computer readable recording medium.

2. Description of Related Art

Recently, the advancement of the electronic technologies has enabled development of various types of electronic products and wide use thereof. Specifically, electronic products such as TVs, cellular phones, PCs, notebook PCs, PDAs, set-top boxes or the like are widely used in public places as well as most ordinary families.

There is the risk of password exposure when attempting user authentication in public places, in particular. Specifically, a password input by way of typing has a possibility that the password is exposed to a third party who may use the exposed password. Accordingly, in order to solve the above problem, the technology of authenticating with one-time password has been proposed. However, when using one-time password, a user may have inconvenience of having to confirm an input password upon every log-in by email, text message, or certain device. Further, when period or frequency of using the same password is set in order to avoid such inconvenience, a problem occurs, where a third party may utilize the password for authentication if the password is exposed during the set period and frequency.

Further, when the password is input by way of voice utterances, the password may be exposed to and recorded by a third party who may attempt authentication by playing back the recorded form of the authenticated user's voice.

Accordingly, it is necessary to provide a new authentication technology that can enhance user convenience and also remove a risk of theft even when a password uttered or input by a user is exposed.

SUMMARY

Example embodiments of the present disclosure address the above disadvantages and other disadvantages not described above.

The present disclosure is provided to address the problems described above, and the present disclosure is to provides an electronic apparatus for preventing and/or reducing password exposure by performing authentication with a password modified from a stored password according to specific standard, a method for controlling thereof, and a computer readable recording medium.

In an example embodiment, an electronic apparatus is provided, which may include a memory configured to store a preset password, and a processor configured to provide information with respect to a password modification method and perform an authentication process for an input password using the preset password and the password modification method.

The processor may determine that the input password is authenticated, when a character in a preset order among a plurality of characters of the preset password and a character in a preset order among a plurality of characters of the input password match each other based on the password modification method.

The password modification method may, for example, include conditions of 'True', 'False', 'Ignore' applied one by one to each of a plurality of characters of the preset password, and the processor may perform the authentication process for the input password using a password modified based on the conditions.

The memory may store a plurality of indicators matched with the conditions, respectively, and the processor may provide an indicator among the plurality of indicators that corresponds to the condition applied to each of the plurality of characters of the preset password.

The memory may store a set of conditions applied to each of the plurality of characters of the preset password and the indicator matched with the set of conditions, and the processor may perform the authentication process for the input password based on the stored set of conditions.

The processor may provide a different indicator every time the processor performs the authentication process.

The electronic apparatus may further include a display, and the processor may control the display to display the password modification method.

The electronic apparatus may further include a microphone configured to receive an input of a voice, and the processor may recognize the voice input through the microphone and perform an authentication process on a result of the recognition.

The electronic apparatus may further include a communicator comprising communication circuitry in communication with an external device, and the processor may transmit a result of performing the authentication for the input password to the external device.

In response to the input password being authenticated, the processor may provide a content corresponding to an account of the authenticated password.

In another example embodiment, a method for controlling an electronic apparatus is provided, which may include registering a preset password, providing information with respect to a password modification method, and performing an authentication process for an input password using the preset password and the password modification method.

The performing the authentication process may include determining that the input password is authenticated, when a character in a preset order in a plurality of characters of the input password and a character in a preset order in a plurality of characters of the preset password match each other based on the password modification method.

The password modification method may, for example, include conditions of 'True', 'False', 'Ignore' applied one by one to each of a plurality of characters of the preset password, and the performing the authentication process may include performing the authentication process for the input password using a password modified based on the conditions.

The method for controlling may further include storing a plurality of indicators matched with the conditions, respectively, and the providing may include providing an indicator among the plurality of indicators that corresponds to the condition applied to each of the plurality of characters of the preset password.

The method for controlling may further include storing a set of conditions applied to each of the plurality of characters of the preset password and the indicator matched with the set of conditions, and the performing the authentication process may include performing the authentication process for the input password based on the stored set of conditions.

The providing may include providing a different indicator every time the authentication process is performed.

The providing may include displaying the password modification method through a display.

The performing the authentication process may include, when voice is input, recognizing the input voice and performing an authentication process on a result of the recognition.

The method for controlling may further include, in response to the input password being authenticated, providing a content corresponding to an account of the authenticated password.

In another example embodiment, a non-transitory computer readable recording medium may have recorded thereon a program for implementing a method for controlling an electronic apparatus, in which the method for controlling may include registering a preset password, providing information with respect to a password modification method, and performing an authentication process for an input password using the preset password and the password modification method.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
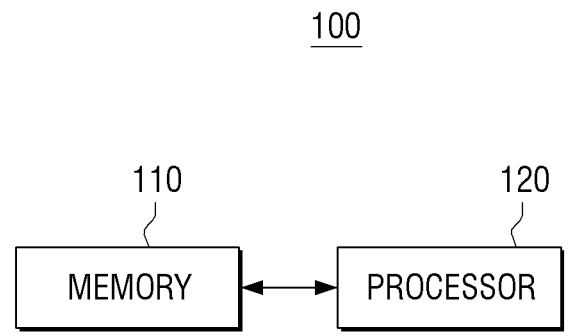
FIG. 1 a block diagram illustrating an example configuration of an electronic apparatus according to an embodiment.

Terms used in this present disclosure will be briefly explained, and the present disclosure will be described in greater detail below.

Terms used in this present disclosure are selected from general terms in consideration of functions in the present disclosure and used currently and widely as possible; however, terms may be different according to intention of persons skilled in the art or precedents, and emergence of new technology. Further, in specific cases, terms may be arbitrarily selected, and in this case, the meaning will be described in greater detail in a corresponding part of the present disclosure. Accordingly, terms used in this present disclosure are be defined based on the meaning in itself and description of the present disclosure.

Since various example embodiments of the present disclosure may be variously modified and may have various other embodiments, specific embodiments will be illustrated by way of example with reference to the drawings and described in greater detail in the disclosure. However, it is not intended to limit and/or confine the present disclosure, and rather, should be understood to include all modifications, equivalents and alternatives within the concept and scope of the disclosure. Specific explanation may not be provided when specific explanation with respect to the relevant published technology obscures the essence of the present disclosure.

Terms of "first," "second" or the like are used to describe various elements, but elements may not be limited by the terms. The terms are used simply for distinguishing one element from another element.

Singular expressing terms may include plural expressions unless they conflict with the context. In the present disclosure, it should be understood that terms such as "comprise," "consist of" or the like designate presence of features, numbers, processes, operations, elements, components or combination of these that are described in the description and may not exclude presence or possibility of adding one or more features, numbers, processes, operations, elements, components or combination of these.

Further, in some embodiments of the present disclosure, "module," "unit" or the like may perform at least one function or operation and may be implemented as hardware, software, or any combination of hardware and software. Further, except for "module" or "part" required to be implemented as specific hardware, a plurality of "modules" or "units" may be integrated into at least one module and implemented as at least one processor.

The following will describe various example embodiments of the present disclosure by referring to the attached drawings. However, it is to be understood that the present disclosure may be implemented in various different forms and may not be limited by the various example embodiments described herein. Further, illustration of the elements or operations unrelated with the description may be omitted for the clarity of the present disclosure, and the like or similar elements or operations may be referred by the same or similar drawing reference numerals throughout the disclosure.

The following will explain various example embodiments of the present disclosure in greater detail with reference to the drawings.

FIG. 1 is a block diagram illustrating an example configuration of an electronic apparatus according to an embodiment.

Referring to FIG. 1, the electronic apparatus 100 includes a memory 110 and a processor (e.g., including processing circuitry) 120.

The electronic apparatus 100 may process contents. For example, the electronic apparatus 100 may process previously-stored contents, or contents input from an external input source. In an example, the electronic apparatus 100 may include various devices having a display, such as, for example, and without limitation, one or more of a TV, cellular phone, smart phone, PDA, notebook PC, monitor, tablet PC, electronic book, electronic frame, kiosk, or the like. In this case, the electronic apparatus 100 may display the processed contents. Meanwhile, the electronic apparatus 100 may include various devices that do not include a display, such as, for example, and without limitation, one or more of a server, set-top box, or the like. In this case, the electronic apparatus 100 may transmit the processed contents to an external device that has a display.

The memory 110 may store various programs and data necessary for operation of the electronic apparatus 100. For example, the memory 110 may store parameters for image processing of input images.

The memory 110 may store a preset password. In an example, the preset password may be input by user manipulation. Meanwhile, the received preset password may be a previously-stored password received from an external device.

Further, the memory 110 may store a password modification method. In an example, the password modification method may refer, for example, and without limitation, to applying a preset condition of modifying a password stored in the memory 110 and may be set previously by a user.

For example, the password modification method may apply conditions such as, for example, and without limitation, 'True', 'False', 'Ignore', or the like, for each character of the preset password. In an example, 'True' refers to a condition directing that a character to the same as a preset password character be input, 'False' refers to a condition directing that a character different from a preset password character be input, and 'Ignore' refers to a condition directing that any character be allowed to be input. For example, when a preset password stored in the memory 110 by a user is '1 2 3 4' and a password modification method is 'T F F T,' (e.g., True, False, False, True) authentication is successful when the input password includes a first digit of '1,' a fourth digit of '4' a second digit of a character different from '2' and a third digit of a character different from '3.'

Further, when a preset password is a number password, the password modification method may include a method for performing specific calculation on the preset password based on a condition set by a user, in addition to 'True', 'False', 'Ignore' conditions. For example, the password modification method may, for example, and without limitation, be a method by which password authentication is successful when each digit of the preset password added by a preset value is input or may be a method by which password authentication is successful when the preset password as one integrated number added by a preset value is input.

Further, the memory 110 may match and store an indicator corresponding to a password modification method. In an example, the indicator may be provided to inform which password modification method is used and may be stored in matching with each of the password modification methods.

For example, the indicator may be matched with respect to each of the conditions of a password modification method. Specifically, the indicator may be provided in various forms such as, for example, and without limitation, figures, colors, or the like, and/or provided in an auditory form instead of a visual form.

For example, when it is assumed that an indicator is configured as a figure and the user sets that 'True' condition is matched with a circle (●), 'False' condition is a triangle (▲), and 'Ignore' condition is a rectangle (■), an indicator corresponding to a password modification method having 'T F F T' pattern may be '● ▲ ▲ ●'. An example embodiment of providing such indicator will be described in greater detail below with reference to FIGS. 3, 4A and 4B. A pattern of such modification method may be previously stored by a user, or may be created by the processor 120 each time a password input is required by the he processor 120. Even when the pattern is created randomly by the processor 120, since the user may know conditions respectively corresponding to the provided indicators, the user may input a password applying the pattern.

Meanwhile, the memory 110 may store a set of conditions applied to each of a plurality of characters of a preset password. Further, the memory 110 may store indicators matched with the set of conditions. For example, the memory 110 may match and store '±' as an indicator corresponding to the pattern such as 'T F F T.' This may be matched by a user. An example embodiment of providing an indicator will be described in greater detail below with reference to FIGS. 5 and 6.

The memory 110 may store a plurality of such password modification methods. Further, the memory 110 may match and store at least one indicator with respect to each of the password modification methods. Thus, a different indicator may be provided even under the same modification condition.

The processor 120 may include various processing circuitry and perform an authentication process for the input password. In an example, a password may be input, for example, and without limitation, by typing, utterance, or the like.

For example, the processor 120 may provide information on the password modification methods stored in the memory 110, and perform an authentication process for the input password using a preset password and a password modification method stored in the memory 110.

In an example, the processor 120 may provide an indicator corresponding to the password modification method. For example, the password modification method may include conditions with respect to each of a plurality of characters of a preset password. In an example, the processor 120 may provide an indicator corresponding to conditions applied to each of a plurality of characters of a preset password an a per character basis.

When the password modification method includes a set of conditions, the processor 120 may provide an indicator corresponding to the set of conditions. In an example, the processor 120 may perform an authentication process on the input password based on the set of conditions corresponding to the provided indicator.

The processor 120 may determine that the input password is authenticated, when a character in a preset order among a plurality of characters of the preset password and a character in a preset order among a plurality of characters of the input password match each other based on the modification method of the password.

For example, when it is assumed that a preset password has 4 digits and a password modification method is 'T F F T,' the processor 120 may determine that the authentication of the input password is successful when the first and third digits of the input password match the preset password.

When an input password does not match the password applying the password modification method, the processor 120 may provide a different password modification method. When authentication fails an equal or greater number of times than a preset number, the processor 120 may not allow log-in with the corresponding ID without additional authentication.

The processor 120 may perform an authentication process for the input password using a modified password of the preset password in which each of a plurality of characters of the preset password is modified one by one based on the applied condition. For example, when it is assumed that the preset password is '1 2 3 4' and the password modification method is 'T F F T,' the processor 120 may perform an authentication process for the input password using a modified password '1 (0, 1, 3 to 9) 3 4,' which is modified according to the conditions included in the password modification method.

The processor 120 may use a different password modification method for each authentication process, and may provide the information on the password modification method to be used.

For example, the processor 120 may apply a different condition to each of a plurality of characters of a password every time it 120 performs an authentication process. Accordingly, the processor 120 may provide a different indicator to each of a plurality of characters of a password every time it performs an authentication process.

When the password modification method includes a set of conditions, the processor 120 may use a different set of conditions every time it performs an authentication process, and accordingly, the processor 120 may provide an indicator corresponding to the used set of conditions. Thus, the processor 120 may use a plurality of sets of conditions stored in the memory 110 every time it performs an authentication process and may provide a different indicator according to the used set of conditions.

When the input password is authenticated, the processor 120 may provide contents corresponding to an account of the authenticated password. For example, when the input password is successfully authenticated, the processor 120 may allow to access personal information or personal contents of the user account of the authenticated password and execute functions, or recommend contents based on history of use of the user account.

While it is described above that one electronic apparatus 100 performs all the operations described above, in actual implementation, a plurality of electronic apparatuses may share and perform a part of the operations. For example, a part of the operations among a plurality of the operations described above may be performed at, for example, and without limitation, a remote control device, a server, a set-top box, or the like, and the rest of the operations may be performed by a display device.

As described above, authentication of an input password may be performed based on a password modification method after an indicator corresponding to the password modification method is provided. Accordingly, there is an effect of reduced inconvenience of the user who would otherwise be required to confirm a password through a separate device whenever the user inputs a password, and also reduced concern on the password theft in case of password exposure.

Figure 2:
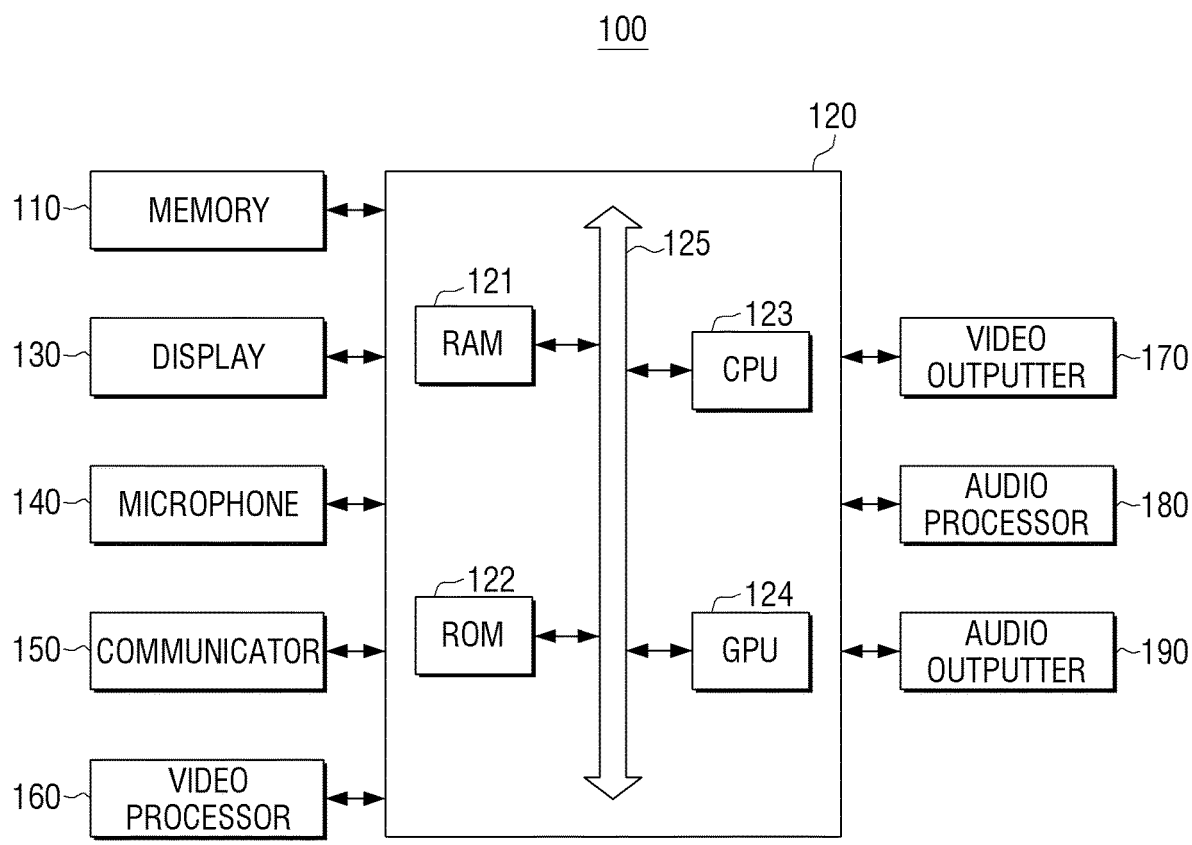
FIG. 2 is a block diagram illustrating an example configuration of the electronic apparatus in FIG. 1.

FIG. 2 is a block diagram illustrating an example configuration of the electronic apparatus of FIG. 1 according to an example embodiment.

Referring to FIG. 2, the electronic apparatus 100 may include a memory 110, a processor (e.g., including processing circuitry) 120, a display 130, a microphone 140, a communicator (e.g., including communication circuitry) 150, a video processor (e.g., including video processing circuitry) 160, a video outputter (e.g., including video output circuitry) 170, an audio processor (e.g., including audio processing circuitry) 180, and an audio outputter (e.g., including audio output circuitry) 190.

In this example, the memory 110 may be the same as or similar to that illustrated in FIG. 1, and accordingly, overlapping description will not be repeated below.

The processor 120 may include Random Access Memory (RAM) 121, Read-Only Memory (ROM) 122, Central Processing Unit (CPU) 123, Graphic Processing Unit (GPU) 124, and a bus 125. The RAM 121, the ROM 122, the CPU 123, and the GPU 124 may be connected to each other through the bus 125.

The CPU 123 may perform booting by accessing the memory 110 and using the stored O/S in the memory 110. Further, various operations may be performed using various programs, contents, data or the like stored in the memory 110.

The ROM 122 may store a set of instructions for system booting. When a turn-on command is input and the electrical power is supplied, the CPU 123 may copy the O/S stored in the memory 110 onto RAM 121 according to the instructions stored in ROM 122, and boot the system by implementing O/S. When booting is completed, the CPU 123 may copy various programs stored in the memory 110 onto RAM 121, and perform various operations by implementing the programs copied onto RAM 121.

When booting of the electronic apparatus 100 is completed, the GPU 124 may display a user interface (UI) on the display 140. For example, the GPU 124 may generate a screen including various objects such as icons, images like virtual keypad images, texts and so on using a calculator (not illustrated) and a renderer (not illustrated). The calculator may calculate feature values such as coordinate values, shapes, sizes, colors and so on in which each object is displayed according to a layout of the screen. The renderer may generate various layouts of the screen including the objects based on the feature values calculated in the calculator. The screen (or user interface window) generated in the renderer may be provided to the display 140, and displayed respectively on a main display region and a sub-display region.

The display 130 may display a screen corresponding to image signals received under the control of the processor 120. For example, the display 130 may display the password modification method under the control of the processor 120. In an example, the display 130 may display an indicator corresponding to the password modification method. For example, the display 130 may display indicators per character, respectively corresponding to conditions applied to each of characters of a preset password. Meanwhile, the display 130 may display one indicator corresponding to a set of conditions. In an example, the indicator may be implemented in various forms such as, for example, and without limitation, figures, colors, numbers, or the like.

The display 130 may be implemented in various forms of displays such as, for example, and without limitation, liquid crystal displays (LCDs), organic light emitting diode (OLED) display, plasma display panel (PDP), or the like. The display 130 may include a driving circuit, a backlight unit and so on, which may be implemented as a-si TFT, low temperature poly silicon (LTPS), TFT, organic TFT (OTFT), or the like. Further, the display 130 may be implemented as a flexible display. Further, when the electronic apparatus 100 is implemented as a set-top box, a server or the like according to various implementing forms, the electronic apparatus 100 may not include the display 130. Operation of the electronic apparatus 100 excluding the display 130 will be described in greater detail below with reference to FIG. 11.

The microphone 140 may generate voice signals corresponding to the received voice. The microphone 140 may be included in the electronic apparatus 100 or may be an external microphone separately provided outside the electronic apparatus 100 and electronically connected to the electronic apparatus 100.

When the electronic apparatus 100 includes the microphone 140, the electronic apparatus 100 may, for example, receive analogue voice signals through the microphone, digitize the received analogue voice signals, and process the digitized voice data.

When the electronic apparatus 100 receives the voice data from the external microphone, the external microphone may, for example, digitize the received analogue voice signals and transmit the digitized voice data to the electronic apparatus 100. In an example, the electronic apparatus 100 may receive the voice data from the external microphone with the data communication method such as, for example, and without limitation, WiFi, Bluetooth, or the like. In an example, the external microphone may include a microphone included in a remote control device for controlling the electronic apparatus 100, a microphone included in a smart phone installing a remote controller application for controlling the electronic apparatus 100, a separate external microphone connected to the electronic apparatus 100, or the like.

When a password is input in voice form, the processor 120 may recognize the voice input through the microphone 140, and perform the authentication process with respect to a result of recognition. In an example, the preset password stored in the memory 110 may be a password that has been stored by the user by voice input.

The processor 120 may include various processing circuitry and perform an authentication process using a voice input through the microphone 140 and a preset password and a password modification method stored in the memory 110. The processor 120 may perform an authentication process by comparing a result of recognizing and converting the input voice into characters, with a password modified by applying the modification method to the preset password stored as characters in the memory 110. The processor 120 may perform an authentication process by comparing a result of recognizing and converting the input voice into characters, with a modified password modified by applying the modification method to the result of converting the preset password stored in voice form in the memory 110 into characters.

The communicator 150 may include various communication circuitry configured to perform communication with various types of external devices according to various communication methods. The communicator 150 may be connected, for example, to an external device through local area network (LAN) or internet network. Further, it may be connected to an external device according to wireless communication method (e.g., Z-wave, 4LoWPAN, RFID, LTE D2D, BLE, GPRS, Weightless, Edge Zigbee, ANT+, NFC, IrDA, DECT, WLAN, Bluetooth, WiFi, Wi-Fi Direct, GSM, UMTS, LTE, WiBRO or the like).

The communicator 110 may include a plurality of communication modules including communication circuitry to perform communication with an external device using various communication methods. For example, the communicator 100 may perform communication with a remote control device using infrared rays and perform communication with a server using Wi-Fi. Also, the communicator 100 may perform communication with both the remote control device and the server using WiFi only, but the present disclosure is not limited thereto.

The communicator 150 under the control of the processor 120 may transmit a result of authentication with respect to an input password to an external device.

When a device input with a password is separate from a device that processes the password, e.g., when the electronic apparatus 100 is a server, the communicator 150 may receive character data input by typing, voice data input in voice from an external device, or the like, but is not limited thereto.

The video processor 160 may include various video processing circuitry configured to process the contents received through the communicator 150 and/or the video data included in the contents stored in the memory 110. The video processor 160 may perform various image processing with respect to the video data, such as, for example, and without limitation, decoding, scaling, noise filtering, frame rate converting, resolution converting, or the like.

The video outputter 170 may include various video output circuitry and output the video data processed in the video processor 160. In an example, when the electronic apparatus 100 includes the display 130, the video outputter 170 may be in the same configuration as the display 130. However, when the electronic apparatus 100 does not include the display 130 and/or when an external display apparatus displays image, the electronic apparatus 100 may, for example, and without limitation, be in a port configuration for providing image signals to the external display apparatus.

The audio processor 180 may include various audio processing circuitry configured to process the contents received through the communicator 150 and/or the audio data included in the contents stored in the memory 110. The audio processor 180 may perform various processes with respect to the audio data, such as, for example, and without limitation, decoding, amplifying, noise filtering, or the like.

The processor 120 may play back corresponding contents by driving the video processor 160 and the audio processor 180 when a playback application is executed for multimedia contents. In an example, the display 130 may display an image frame generated in the video processor 160 on at least one of a main display region and a sub-display region.

The audio outputter 190 may include various audio output circuitry and output the audio data generated in the audio processor 180. In an example, the audio outputter 190 may include, for example, and without limitation as a speaker included in the electronic apparatus 100 that converts voice signals into sounds, a port configuration that provides voice signals to an external speaker, or the like.

The password modification method may be provided auditorily, in which case, for password input, the audio outputter 180 may output an auditory indicator corresponding to the password modification method under the control of the processor 120. Such auditory indicator may be an indicator previously matched with the password modification method by the user and stored in the memory 110.

While the video outputter 170 and the audio outputter 190 are described above as separate configurations from each other, when, for example, the electronic apparatus 100 includes HDMI port to simultaneously transmit video signals and audio signals, the video outputter 170 and the audio outputter 190 may, for example, be implemented as one physical configuration.

When the image is transmitted through the video outputter 170 to an external display apparatus, the processor 120 may add and transmit Graphic User Interface (GUI) to the transmitted image. For example, the processor 120 may transmit the image output from the video processor 160 and added with GUI to the external display apparatus.

In addition, although not illustrated in FIG. 2, according to an example embodiment, the electronic apparatus 100 may further include various external input ports for connecting to various external terminals, such as, for example, and without limitation, a USB port to be connected with a USB connector, an HDMI port, headset, mouse, LAN, or the like, digital multimedia broadcasting (DMB) chip for receiving and processing DMB signals, various sensors, a camera for capturing still images or videos, or the like.

FIGS. 3, 4A, 4B, 5 and 6 are diagrams illustrating various example embodiments of providing a password modification method.

Figure 3:
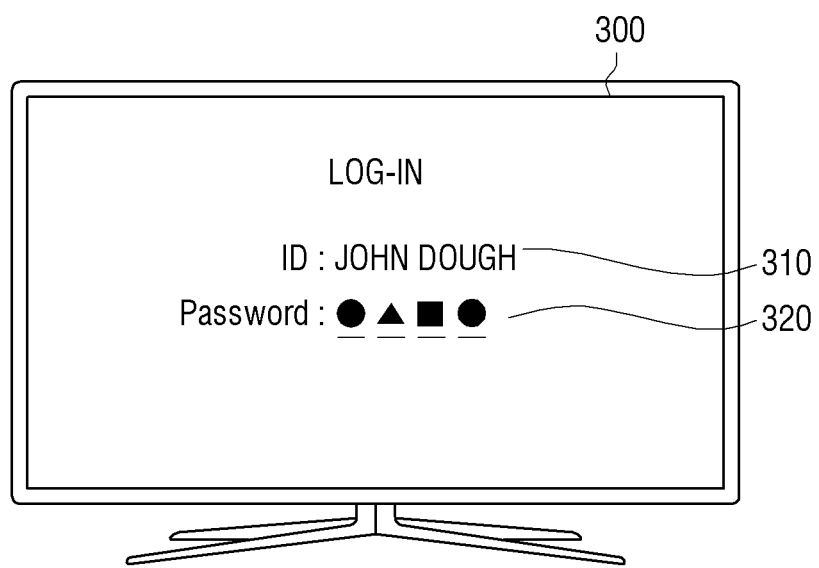
FIGS. 3, 4A, 4B, 5 and 6 are diagrams illustrating various examples of providing a password modification method according to example embodiments.

Referring to FIG. 3, the electronic apparatus may display a log-in screen 300 to perform the log-in with a user account. In an example, the log-in screen 300 may include an ID input region 310 and a password input region 320. Meanwhile, when performing the log-in with voice, the ID input region 310 may be omitted because voice print of a speaker may serve as ID.

In an example, the electronic apparatus may provide a password modification method to the password input region 320. For example, the electronic apparatus may select one of a plurality of stored password modification methods, generate a password modification method randomly, or the like, and display an indicator corresponding to the selected or generated password modification method on the password input region 320.

As illustrated in FIG. 3, it is assumed that a preset password has 4 digits and indicators corresponding to the conditions respectively applied to a plurality of characters of a preset password included in a password modification method are displayed per character. For example, when it is assumed that an indicator is in a form of a figure and a user sets that 'True' condition matches a circle, 'False' condition matches a triangle, and 'Ignore' condition matches a rectangle, the user is able to log in successfully only after confirming an indicator '● ▲ ■ ●' illustrated in FIG. 3 and then inputting a password that applies a condition corresponding to the indicator displayed on the preset password.

Although FIG. 3 illustrates an example in which the indicator is a figure, in actual implementation, the indicator may, for example, be implemented as different colors matched each other according to conditions. Further, the user may not match the conditions and the indicators on a 1:1 basis. For example, and without limitation, the user may match and store an indicator corresponding to 'True' condition with a circle, a star, a red circle, a yellow circle, or the like. In this case, the electronic apparatus may provide a different indicator even for the same condition, and accordingly, a risk of inferring a password by a third party may be lowered and concern on password theft may be also reduced even when the password input by a user is exposed during logging in.

Although FIG. 3 illustrates that the indicator is displayed on the password input region, in actual implementation, the indicator may be displayed in one region of the log-in screen rather than in a password input region.

Figure 4A:
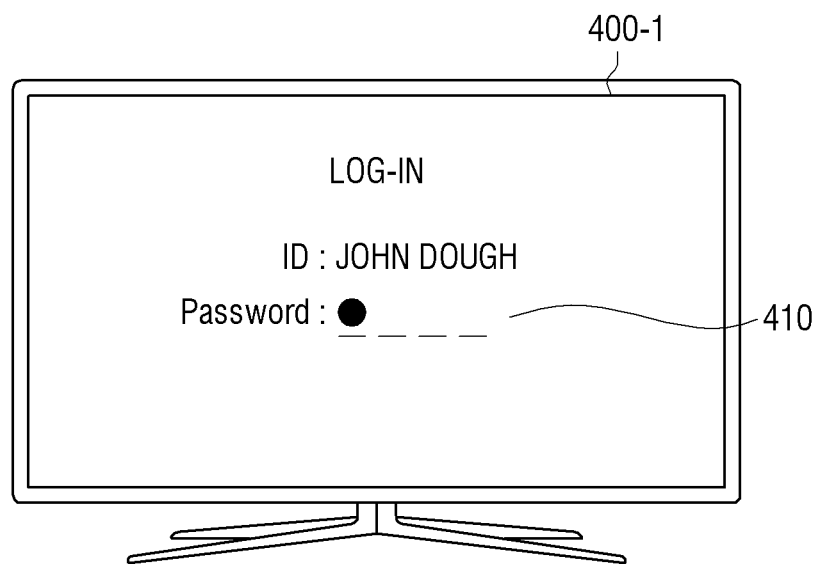
Figure 4B:
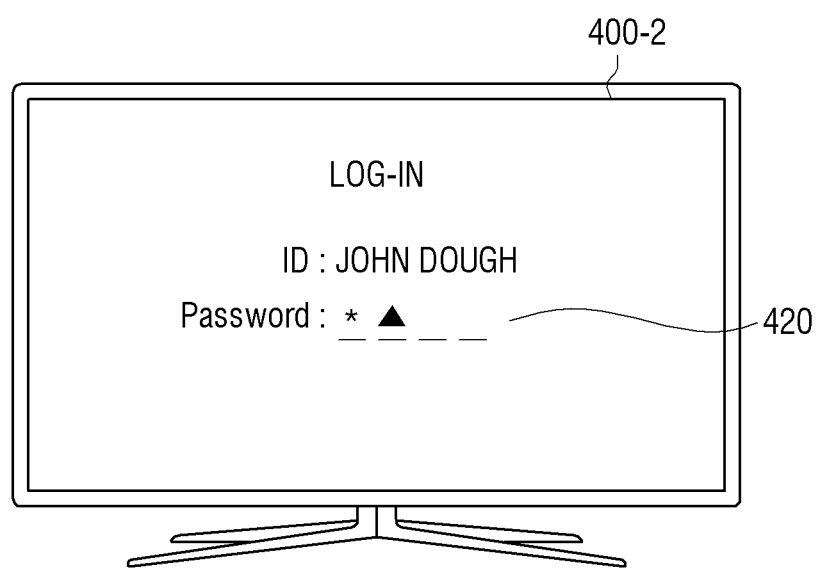

While FIG. 3 illustrates an embodiment in which the indicators provided per character are displayed together on one screen, the electronic apparatus may sequentially provide indicators as illustrated in FIGS. 4A and 4B.

Referring to FIG. 4A, the electronic apparatus may display a log-in screen 400-1 for performing log-in with a user account. In an example, the log-in screen 400-1 may include an ID input region and a password input region 410. Meanwhile, when performing the log-in with voice, the ID input region may be omitted because user voice print may serve as ID.

In an example, the electronic apparatus may provide a password modification method on the password input region 410. For example, the electronic apparatus may select one among a plurality of stored password modification methods, generate a password modification method randomly, or the like, and display an indicator corresponding to the selected or generated password modification method on the password input region 410. In an example, the electronic apparatus may sequentially display indicators one by one.

When the user inputs a first character of a password, the electronic apparatus may display a log-in screen 400-2 including the password input region 420 with a mark '*' indicating that a first digit of the password is input, and provides an indicator corresponding to a condition applied to a second digit, as illustrated, for example, in FIG. 4B. Accordingly, the user may intuitively recognize on which digit of the password he or she is currently inputting a character.

Meanwhile, although FIGS. 4A and 4B illustrate that the indicator is sequentially displayed one by one, various modifications may be implemented, and for example, two indicators may be displayed at a time in the sequential display of the indicators.

Figure 5:
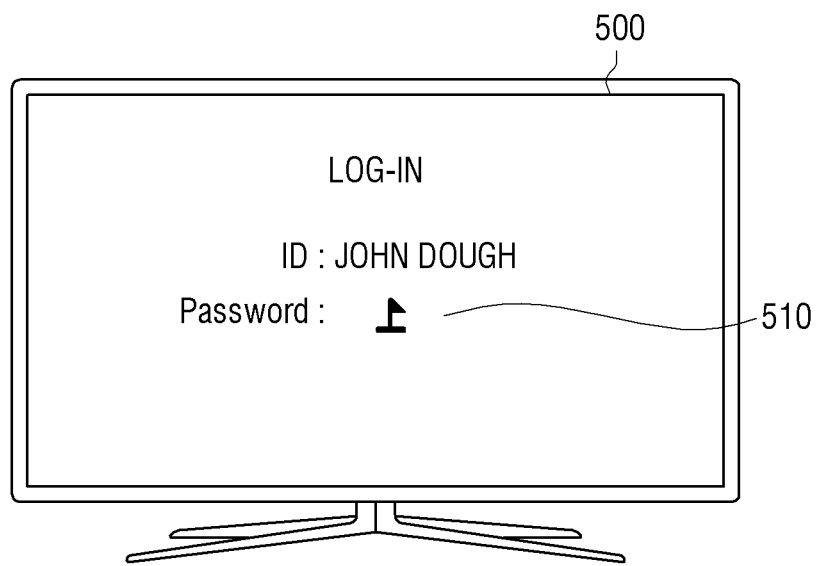

While FIGS. 3 and 4A and 4B illustrate that the indicators are provided per character of the password, the electronic apparatus may display an indicator corresponding to a set of conditions as illustrated, for example, in FIG. 5.

Referring to FIG. 5, the log-in screen 500 may include a password input region 510 for providing an indicator '☨' corresponding to a set of conditions. For example, when the user matches and stores an indicator '☨' with a modification condition 'T F F T,' the user may confirm the provided indicator '☨' and input a password applying a condition 'T F F T' corresponding to the preset password '☨.'

As described above, a risk of the password modification method being exposed to a third party may be lowered, since an indicator corresponding to a set of conditions is displayed rather than displaying indicators corresponding to conditions per character.

While FIG. 5 illustrates that the indicator is displayed in the password input region, in actual implementation, the indicator may be displayed in one region of the log-in screen rather than the password input region.

Figure 6:
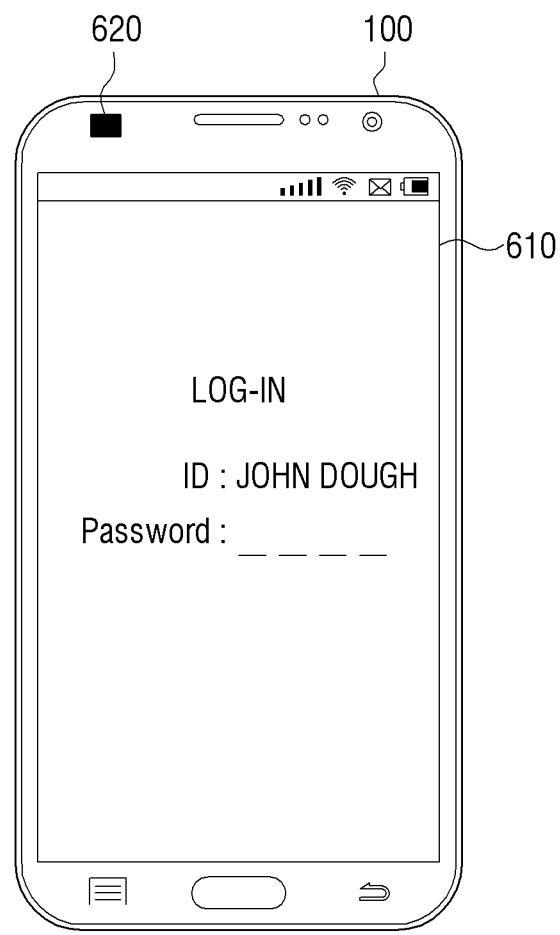

The indicator may not be limited to being displayed on the display, and accordingly, may be provided using LED 620 included in the electronic apparatus 100, as illustrated in FIG. 6.

Referring to FIG. 6, the electronic apparatus 100 may display a password modification method through the LED 620 when the log-in screen 610 is displayed for the log-in.

For example, a plurality of password modification methods may be respectively matched with LED colors and stored by a user. In an example, the electronic apparatus 100 may select one modification method among a plurality of stored password modification methods and illuminate the LED in a matching color.

For example, when the selected password modification method is a set of conditions, the electronic apparatus 100 may provide a password modification method by illuminating the LED in a color corresponding to the set of conditions. When the selected password modification method is to provide an indicator per character, the electronic apparatus 100 may sequentially illuminate the LED in a color corresponding to the conditions applied per character. For example, the electronic apparatus 100 may illuminate the LED in a color corresponding to a condition applied to a first digit, and when the user inputs the character for the first digit, the electronic apparatus 100 may then illuminate the LED in a color corresponding to a condition applied to a second digit.

Figure 7:
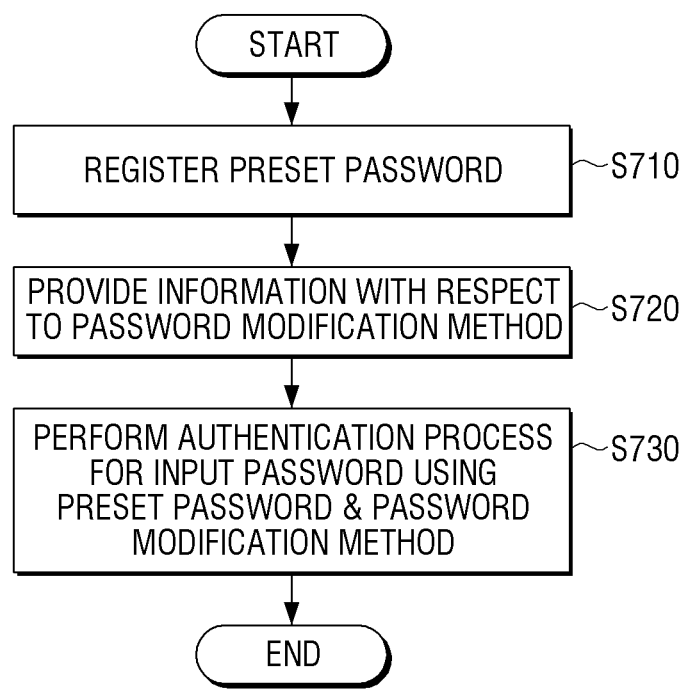
FIG. 7 is a flowchart illustrating an example method for controlling an electronic apparatus according to an embodiment.

FIG. 7 is a flowchart illustrating an example method for controlling an electronic apparatus according to an embodiment.

Referring to FIG. 7, the electronic apparatus may register a preset password, at S710. For example, the preset password may be previously stored by a user. Further, the preset password may be provided by typing, voices, or the like. In an example, the preset password may be matched with ID and stored. However, when the password is voice, the password may be stored without being matched with ID because voice print serves as the ID.

The electronic apparatus may provide information with respect to a password modification method, at S720. For example, the electronic apparatus may select and provide one among a plurality of password modification methods stored by the user, generate a password modification method, or the like, and provide the generated result. In an example, the password modification method may include conditions respectively applied to each of a plurality of characters of a preset password.

Further, the electronic apparatus may provide the password modification method by outputting an indicator corresponding to the password modification method. For example, the electronic apparatus may output an indicator respectively corresponding to conditions applied to each of a plurality of characters of the preset password and output an indicator corresponding to a set of conditions. In an example, and without limitation, the electronic apparatus may provide the password modification method by way of displaying an indicator on the display, illuminating the LED included in the electronic apparatus, outputting voices, or the like.

The electronic apparatus may then perform an authentication process for the input password, at S730. For example, when the password is input after the password modification method is provided, the electronic apparatus may perform an authentication process for the input password using the preset password and the password modification method provided. For example, the electronic apparatus may perform an authentication process by applying the password modification method to the preset password and comparing the modified password with the input password. The electronic apparatus may perform an authentication process by applying the password modification method to the input password rather than the preset password, and comparing the modified input password with the preset password.

As described above, since the user provides information with respect to the password modification method previously set by the user and authenticates the input password using the provided information, the user is provided with enhanced convenience as he or she does not need to check one-time password every time, while there is also an effect that concern on password theft is removed and/or reduced even in the case of password exposure to a third party.

Figure 8:
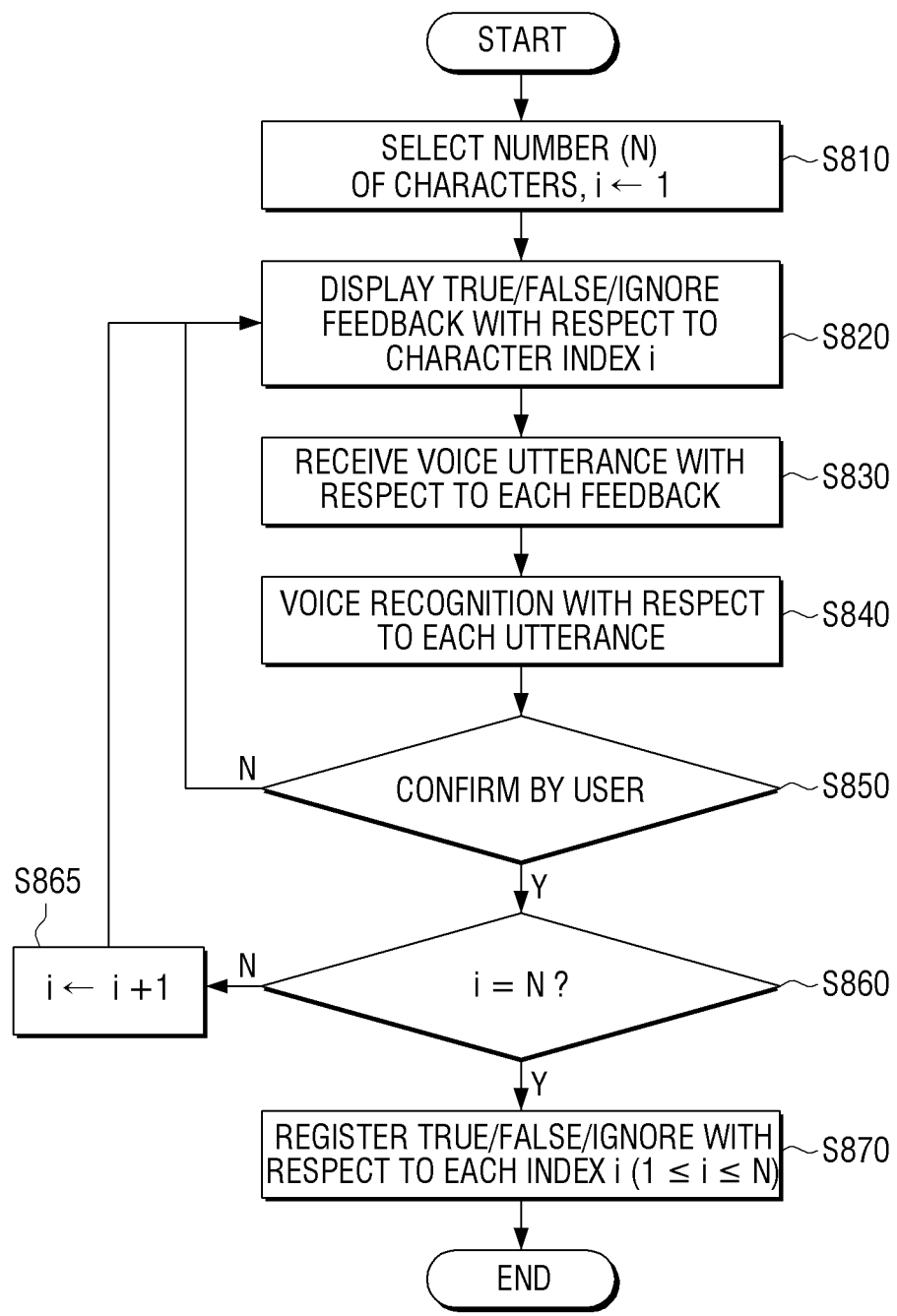
FIG. 8 is a flowchart illustrating an example method for registering a password modification method according to an embodiment.

FIG. 8 is a flowchart illustrating an example method for registering a password modification method according to an embodiment. While the electronic apparatus may generate a password modification method and provide the generated result, FIG. 8 describes an example method for previously registering a password modification method by a user. Further, while the example described below refers to a method for registering a modification method when the password is input with voice, embodiments are not limited thereto, and accordingly, the same process may be equally applied to the registration of the modification method when the password is input by typing.

Referring to FIG. 8, a number N of characters may be selected for the electronic apparatus, at S810. In an example, index i may begin with 1. Index i refers to position of characters of a password, and i=1 refers to a first digit of the password. Further, a character number N may refer to a total number of digits of the preset password. Accordingly, the electronic apparatus may directly receive input of a number N of characters or determine a number N according to a number of characters with respect to a password previously set by a user.

The electronic apparatus may display True/False/Ignore feedback with respect to character index i, at S820. In an example, feedback may indicate indicators respectively corresponding to True/False/Ignore. For example, the electronic apparatus may display indicators respectively corresponding to True/False/Ignore with respect to character index i.

The electronic apparatus may receive voice utterance with respect to each feedback, at S830. For example, the electronic apparatus may receive voice for matching with the displayed indicator. For example, the electronic apparatus may display an indicator corresponding to 'True', and receive voice for matching with an indicator corresponding to 'True'. The electronic apparatus may display an indicator corresponding to 'False', and receive voices for matching with an indicator corresponding to 'False'. While the voice matching 'False' condition is particularly described by way of example, other examples are possible, and accordingly, the condition may be determined to be satisfied when a character different from a preset character for 'False' condition is input.

The electronic apparatus may perform voice recognition with respect to each utterance at S840. For example, the electronic apparatus may convert the received voices into characters and thus obtain the characters.

The electronic apparatus may receive user confirmation at S850. For example, the electronic apparatus may receive confirmation as to whether the uttered voice matches or not, by converting the received voices into characters and displaying the converted characters to the user.

In an example, when the uttered voices and the obtained characters do not match each other at S850-N, the electronic apparatus may perform the processing of index i again from S820.

When the uttered voices and the obtained characters match each other at S850-Y, the electronic apparatus may determine whether the character index i matches a character number N, at S860. In an example, the fact that the character index i and a character number N match may indicate that a modification method is set for the last digit of the preset password.

In an example, when the character index i does not match the character number N at S860-N, the electronic apparatus may modify the index to a new index i by adding 1 to the previous index value, at S865. Further, the electronic apparatus may perform the operations with the modified index i from S820 again. This is to set a password modification method with respect to a next digit of the digit of the preset password where the modification method is set.

When the character index i matches a character number N at S860-Y, the electronic apparatus may register True/False/

Ignore condition with respect to each index i (1≤i≤N), at S870. For example, conditions as listed in Table 1 may be matched and registered. Referring to Table 1, when N is 4, the preset password is (hen cow pig horse) and the password modification method is (T F T F), in which case the modified password may be (hen sea pig pig). Meanwhile, when the password modification method is (I T T F), the modified password may be (monkey cow pig pig).

TABLE 1

| Index | Classification | | | |
| --- | --- | --- | --- | --- |
| | 1 | 2 | 3 | 4 |
| 'True' | hen | cow | pig | horse |
| 'False' | sky | sea | | pig |
| 'Ignore' | monkey | | | snack |

Table 1 is merely an example provided for ease of explanation and should not be understood as limiting.

Although not illustrated, the electronic apparatus may provide indicators with respect to each of T, F, I per character, provide an indicator corresponding to a set of a conditions such as (T F T F), or the like.

Figure 9:
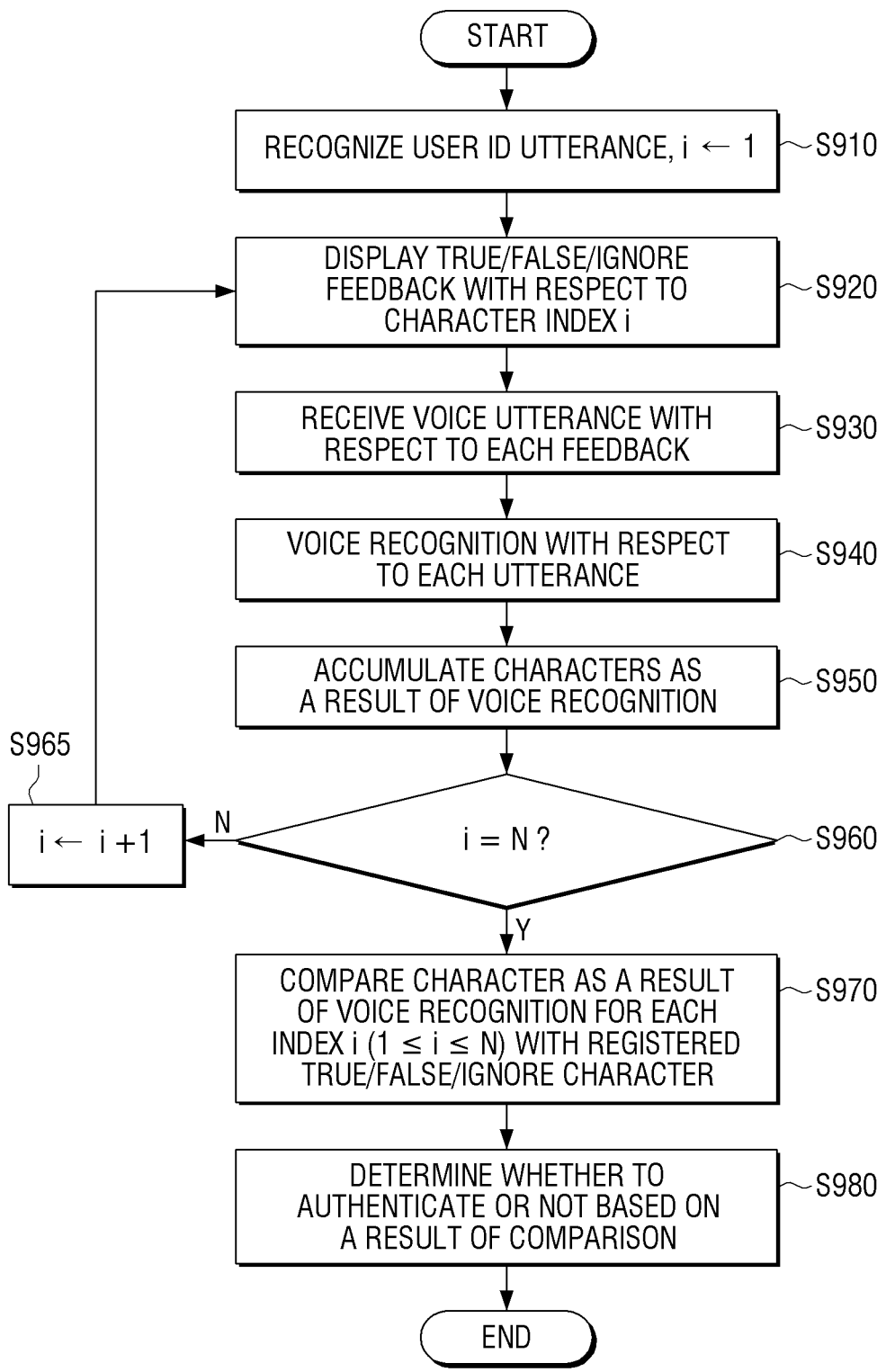
FIG. 9 is a flowchart illustrating an example method for authenticating a password according to an embodiment.

FIG. 9 is a flowchart illustrating an example password authentication method according to an example embodiment. Although the authentication method is described below with reference to an example where the password is input with voice, the embodiment is applicable without limitation, and accordingly, the same process may be applied to the user authentication when the password is input by typing.

The electronic apparatus may perform recognition of user ID utterance at S910. In an example, the index i may begin with 1. This is to specify a preset password for a certain user among a plurality of passwords stored per user account.

The electronic apparatus may display True/False/Ignore feedback with respect to a character index i, at S920. For example, the electronic apparatus may provide an indicator of one condition among 'True', 'False', and 'Ignore' conditions with respect to the character index i.

The electronic apparatus may receive a voice utterance with respect to each feedback at S930. For example, the electronic apparatus may receive the voice uttered by the user based on the displayed indicator.

The electronic apparatus may perform voice recognition for each of the utterances, at S940.

Further, the electronic apparatus may accumulate characters as results of the voice recognition at S950. For example, when i is 1, the electronic apparatus may accumulate a result of recognizing the voice as a character on the first digit.

The electronic apparatus may determine whether a character index i matches a character number N, at S960. In an example, the fact that the character index i and the character number N match may indicate that the modification method is set for the last digit of the preset password.

In an example, when the character index i does not match the character number N at S960-N, the electronic apparatus may modify the index i into a result of adding the previous index value with 1, at S965. Further, the electronic apparatus may perform the operations for the modified index i from S920 again. This is to set a password modification method with respect to a next digit of the digit of the preset password where the modification method is set.

When the character index i matches the character number N at S960-Y, the electronic apparatus may compare the character as a result of the recognition for each index i (1≤i≤N) with the registered True/False/Ignore characters, at S970. For example, the electronic apparatus may compare the result of recognitions accumulated as many as the character number N with the stored characters in order. In an example, the electronic apparatus may compare the result of recognitions with the stored characters based on the indicators provided to each character index i.

The electronic apparatus may determine whether to authenticate or not based on a result of comparison, at S980. For example, the electronic apparatus may determine that the user authentication is successful only when the result of recognition completely matches the stored characters. Meanwhile, depending on setting, the electronic apparatus may determine that the user authentication is successful even when result of comparison does not show 100% matching, if it matches with a preset ratio or higher.

While it is described above that the indicators are sequentially displayed, in actual implementation, the indicators may be displayed at once.

Figure 10:
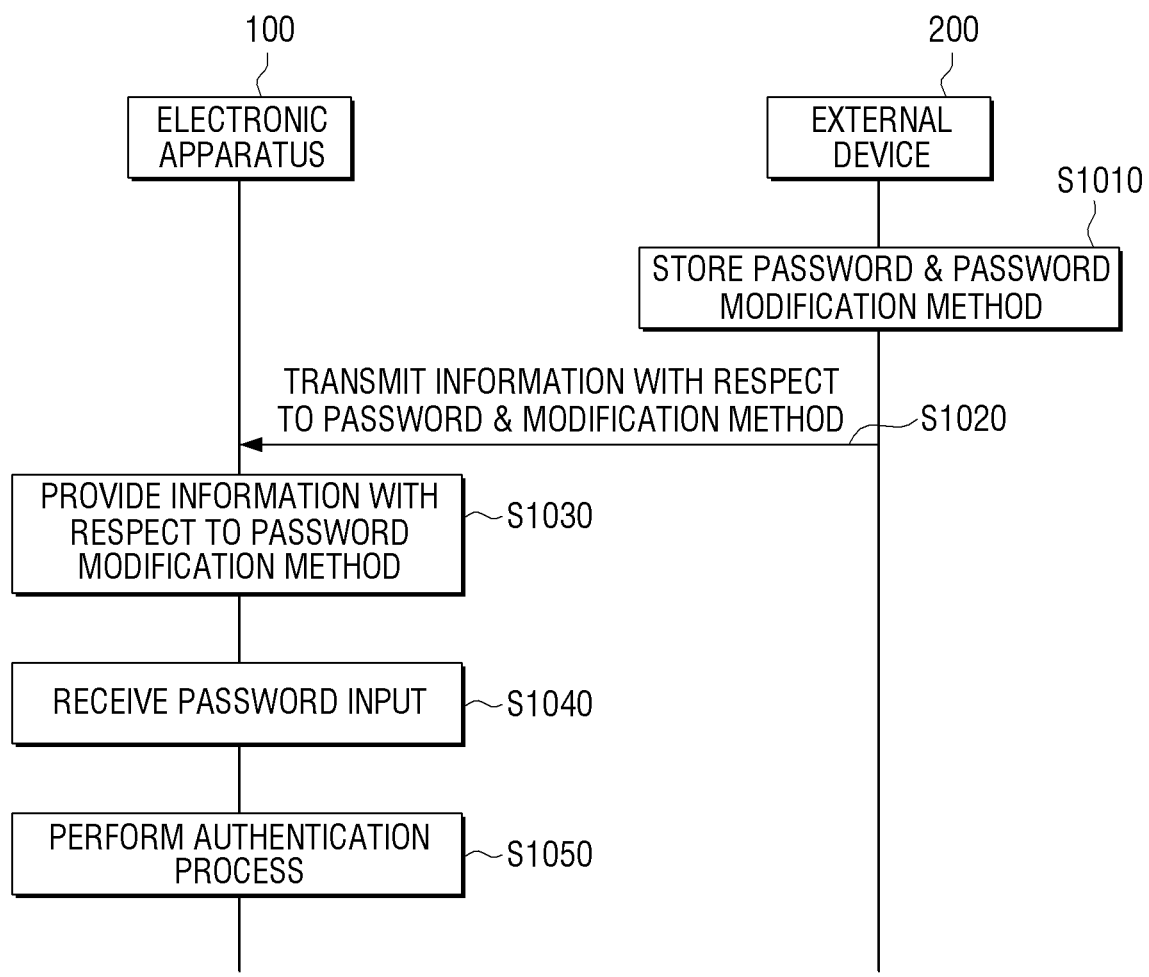
FIGS. 10 and 11 are sequence diagrams illustrating an example process of password authentication in an electronic apparatus according to various example embodiments.

In addition, while an example embodiment is described above in which the electronic apparatus stores the password previously set by the user and the password modification method and performs authentication with respect to the input password, according to another embodiment as illustrated in FIG. 10, the authentication process may be performed using a password and a password modification method stored in an external device.

Referring to FIG. 10, an external device 200 in communication with the electronic apparatus 100 may store a password and a password modification method, at S1010.

The electronic apparatus 100 may receive information on the password and the password modification method stored in the external device 200 from the external device 200 at a time point when the log-in is necessary, at S1020. In an example, the external device 200 may, for example, and without limitation, be a server in communication with the electronic apparatus 100. For example, the external device 200 may store a plurality of password modification methods, and the external device 200 may transmit at least one of a plurality of stored password modification methods to the electronic apparatus 100.

The electronic apparatus 100 may provide information with respect to a password modification method received from the external device 200, at S1030. For example, the electronic apparatus 100 may provide a password modification method by outputting an indicator corresponding to a password modification method among one or more password modification methods received from the server.

The electronic apparatus 100 may receive an input of a password from the user, at S1040. Further, the electronic apparatus 100 may perform an authentication process for the input password, at S1050. For example, the electronic apparatus 100 may perform an authentication process for the input password using a preset password received from the external device 200 and the provided password modification method. For example, the electronic apparatus may perform an authentication process by comparing a modified password modified by applying the password modification method to the preset password, with the input password. The electronic apparatus may perform an authentication process by applying the password modification method to the input password rather than the preset password and comparing the modified input password with the preset password.

Figure 11:
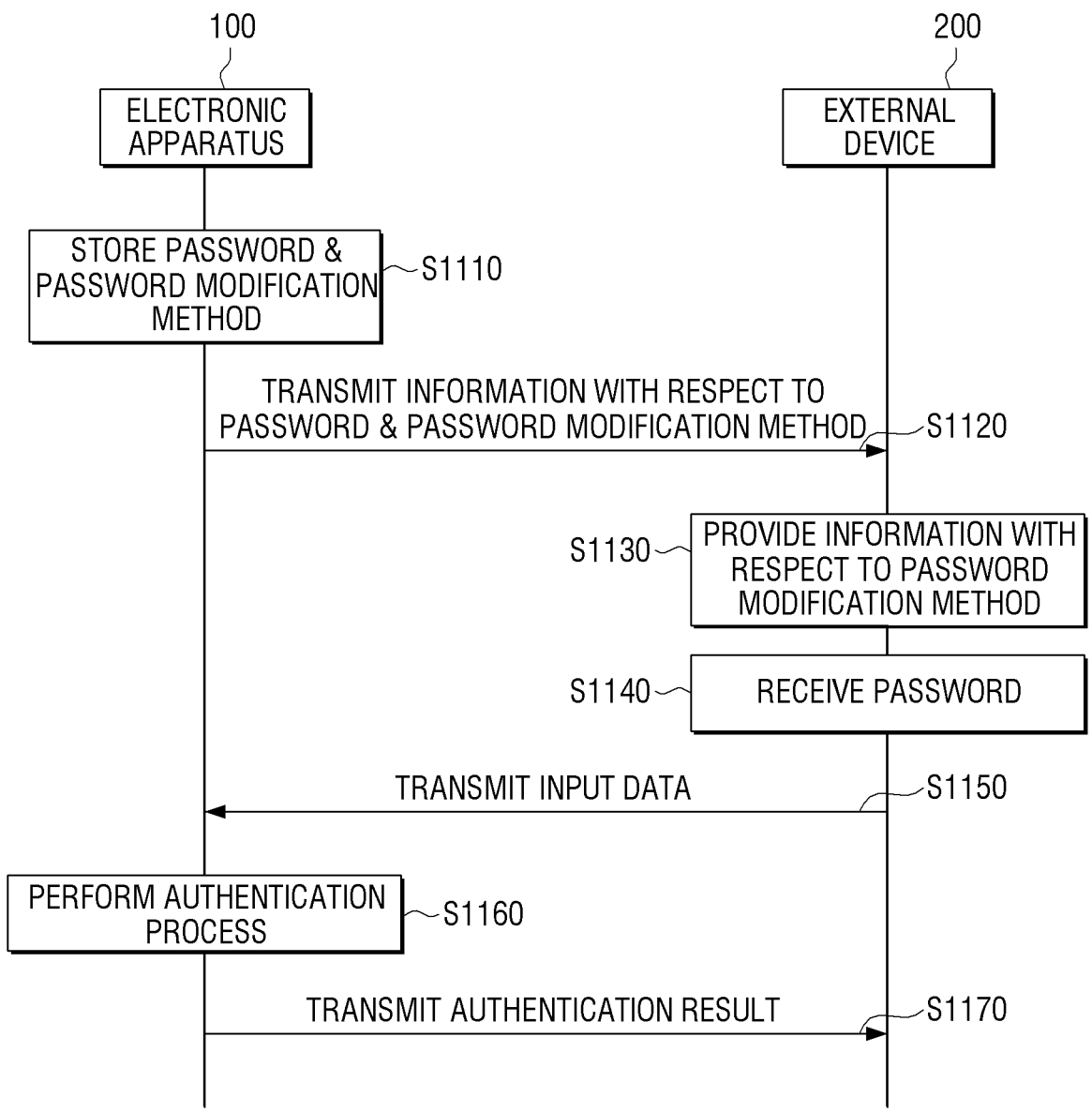

According to another example embodiment, the electronic apparatus may receive the input password from the external device and perform an authentication process for the input password, as illustrated in FIG. 11. In an example, the electronic apparatus 100 may be, for example, and without limitation, a set-top box, a server, or the like.

The electronic apparatus 100 may store a password and a password modification method, at S1110. In an example, the password and the password modification method may be previously stored by user input. Further, the preset password may be formed by, for example, typing, voices, or the like.

Further, the electronic apparatus 100 may transmit information with respect to the password modification method to the external device 200 at a time point when the log-in of a user is necessary, at S1120. In an example, the electronic apparatus 100 may transmit algorithms for modifying the password as the information on the password modification method transmitted to the external device 200 or transmit only an indicator that corresponds to a certain algorithm. In an example, the external device 200 may be a display apparatus capable of interaction with the user, or a server or a set-top box that provides contents to the display apparatus and receives information input by the user.

When receiving the password modification method from the electronic apparatus 100, the external device 200 may provide information with respect to the received password modification method, at S1130. For example, the external device 200 may display information with respect to the password modification method or transmit the information to the external display apparatus for display on the external display apparatus. In an example, when the external device 200 displays information with respect to the password modification method, the provided password modification method may display an indicator corresponding to algorithms for modifying the password. When the external device 200 transmits information with respect to the password modification method to the external display apparatus, the password modification method may, for example, be an indicator corresponding to an algorithm for modifying the password or to a certain algorithm.

When the external device 200 receives a password at S1140, the external device 200 may transmit data with respect to the input password to the electronic apparatus 100, at S1150.

Further, the electronic apparatus 100 may perform an authentication process for the input password, at S1160. For example, the electronic apparatus 100 may perform an authentication process for a password input from the external device 200 using the previously stored preset password and the provided password modification method. For example, the electronic apparatus 100 may perform an authentication process by comparing a modified password modified by applying the password modification method to the preset password, with the input password. The electronic apparatus 100 may perform an authentication process by applying the password modification method to the input password rather than the preset password and comparing the modified input password with the preset password. The electronic apparatus 100 may transmit the authentication result of S1160 to the external device 200 at S1170.

As described above, since the user provides information with respect to the password modification method previously set by the user and authenticates the input password using the provided information, the user is provided with enhanced convenience as the user does not need to check one-time password every time, while there is also an effect that concern on password theft is removed and/or reduced even in the case of password exposure to a third party.

The various example embodiments described above may be implemented within computer or similar device readable recording medium using software, hardware or any combination of these. According to hardware implementation, the embodiments described herein may be implemented using, for example, and without limitation, at least one of application specific integrated circuits (ASICs), digital signal processors (DSPs), digital signal processing devices (DSPDs), programmable logic devices (PDLs), field programmable gate arrays (FPGAs), processors, controllers, micro-controllers, micro-processors, other electrical circuits and units, or the like, for performing functions. In some cases, the embodiments described herein may be implemented as a processor. According to software implementation, the embodiments such as processes and functions described herein may be implemented as a separate software module. Each of the software modules may include various program elements and perform one or more functions and operations described herein.

The method for controlling the electronic apparatus according to various example embodiments described above may be stored in a non-transitory computer readable recording medium. Such non-transitory readable medium may be mounted and used in various devices.

The non-transitory computer readable recording medium refers to a medium that can store data semi-permanently and can be read by a device. For example, the programs for performing the methods described above may be stored and provided in the non-transitory readable medium such as, for example, and without limitation, CD, DVD, hard disk, Blu-ray disk, USB, memory card, ROM, or the like.

According to an example embodiment, the method of various embodiments described in this present disclosure may be included and provided in a computer program product. The computer program product may be dealt as goods between a seller and a buyer. The computer program product may be distributed in a form of device readable storage medium (e.g., compact disc read only memory (CD-ROM)) or distributed online through an application store (e.g., Play Store™). For online distribution, at least a part of a computer program product may be stored at least temporarily in a storing medium such as a server of a manufacturer, a server of an application store or a memory of a mediating server, or may be generated temporarily.

The foregoing example embodiments and advantages are merely examples, and a person skilled in the art may perform various revision and modification without departing from the essence of the present disclosure. Accordingly, the scope of the present disclosure may be defined, for example, in the appended claims, and every technical concept of an equivalent scope should be understood to be included in the scope of the present disclosure.

What is claimed is:

1. An electronic apparatus, comprising:
   a display;
   a memory configured to store a preset password including a plurality of characters; and
   a processor configured to:
   control the display to display a plurality of indicators corresponding to a plurality of characters of the stored preset password without displaying the plurality of characters, each indicator of the plurality of indicators representing a condition of a plurality of conditions set for a respective character of the plurality of characters;
   receive user input according to the displayed plurality of indicators from a user while displaying the plurality of indicators; and
   perform a function corresponding to an authentication based on the stored preset password, the received user input, and the conditions for the characters of the stored preset password, wherein the each indicator of the plurality of indicators is displayed based on a condition corresponding to the respective character of the plurality of characters.

2. The electronic apparatus of claim 1, wherein the processor is configured to determine that the user input is authenticated, when a character in a preset order among the plurality of characters of the preset password and a character in a preset order among a plurality of characters of the user input match each other.

3. The electronic apparatus of claim 1, wherein the plurality of conditions set for the plurality of characters of the preset password include 'True', 'False', and/or 'Ignore', and the processor is configured to perform the authentication for the user input using a password modified based on the conditions.

4. The electronic apparatus of claim 3, wherein the memory is configured to store the plurality of indicators matched with the conditions, respectively, and the processor is configured to provide an indicator among the plurality of indicators corresponding to the condition applied to each of the plurality of characters of the preset password.

5. The electronic apparatus of claim 3, wherein the memory is configured to store a set of conditions applied to each of the plurality of characters of the preset password and an indicator matched with the set of conditions, and the processor is configured to perform the authentication for the user input based on the stored set of conditions.

6. The electronic apparatus of claim 1, wherein the processor is configured to provide a different indicator to each of the plurality of characters each time the processor performs the authentication.

7. The electronic apparatus of claim 1, further comprising:
a microphone configured to receive a voice input,
wherein the processor is configured to recognize the voice input through the microphone and to perform an authentication based on a result of the recognition.

8. The electronic apparatus of claim 1, further comprising:
a communicator comprising communication circuitry configured to be in communication with an external device,
wherein the processor is configured to transmit a result of performing the authentication for the user input to the external device.

9. The electronic apparatus of claim 1, wherein, the processor is configured to provide a content corresponding to an account of an authenticated password based on the user input being authenticated.

10. A method for controlling an electronic apparatus, comprising:
registering a preset password including a plurality of characters;
displaying a plurality of indicators corresponding to a plurality of characters of the preset password without displaying the plurality of characters, each indicator of the plurality of indicators representing a condition of a plurality of conditions set for a respective character of the plurality of characters;
receiving user input according to the displayed plurality of indicators from a user while displaying the plurality of indicators; and
performing a function corresponding to an authentication based on the preset password, the received user input, and the conditions for the characters of the preset password,
wherein the each indicator of the plurality of indicators is displayed based on a condition corresponding to the respective character of the plurality of characters.

11. The method of claim 10, wherein the performing the authentication comprises determining that the user input is authenticated when a character in a preset order in a plurality of characters of the user input and a character in a preset order in the plurality of characters of the preset password match each other.

12. The method of claim 10, wherein the plurality of conditions set for the plurality of characters of the preset password include 'True', 'False', and/or 'Ignore', and the performing the authentication comprises performing the authentication for the user input using a password modified based on the conditions.

13. The method of claim 12, further comprising:
storing the plurality of indicators matched with the conditions, respectively,
providing an indicator among the plurality of indicators corresponding to the condition applied to each of the plurality of characters of the preset password.

14. The method of claim 12, further comprising:
storing a set of conditions applied to each of the plurality of characters of the preset password and an indicator matched with the set of conditions, and
the performing the authentication comprises performing the authentication for the user input based on the stored set of conditions.

15. The method of claim 10, further comprising providing a different indicator to each of the plurality of characters every time the authentication is performed.

16. The method of claim 10, wherein, when a voice is input, the performing the authentication comprises recognizing the input voice and performing an authentication based on a result of the recognition.

17. The method of claim 10, further comprising, providing a content corresponding to an account of an authenticated password based on the user input being authenticated.

18. A non-transitory computer readable recording medium having recorded thereon a program for implementing a method for controlling an electronic apparatus, the method for controlling an electronic apparatus comprising:
registering a preset password including a plurality of characters;
displaying a plurality of indicators corresponding to a plurality of characters of the preset password without displaying the plurality of characters, each indicator of the plurality of indicators representing a condition of a plurality of conditions set for a respective character of the plurality of characters;
receiving user input according to the displayed plurality of indicators from a user while displaying the plurality of indicators; and
performing a function corresponding to an authentication based on the preset password, the received user input and the conditions for the characters of the preset password,
wherein the each indicator of the plurality of indicators is displayed based on a condition corresponding to the respective character of the plurality of characters.

* * * * *